United States Patent [19]

Nagy et al.

[11] Patent Number: 4,889,216
[45] Date of Patent: Dec. 26, 1989

[54] CLUTCH ARRANGEMENT, MAINLY FOR DRIVING THE TAPE-SPINDLE OF MAGNETIC TAPE RECORDER AND/OR PLAY-BACK UNIT

[75] Inventors: Gábor Nagy; György Neumann, both of Budapest, Hungary

[73] Assignee: Egyesult Izzolampa es Villamossagi RT, Hungary

[21] Appl. No.: 186,957

[22] Filed: Apr. 27, 1988

[51] Int. Cl.4 .................. F16D 13/08; F16H 1/44.5
[52] U.S. Cl. .................. 192/48.4; 192/48.2; 242/75.5
[58] Field of Search ............ 192/48.4, 48.2; 242/75.44, 75.47, 75.5, 75.51

[56] References Cited

U.S. PATENT DOCUMENTS

| | | | |
|---|---|---|---|
| 3,446,321 | 5/1969 | Nyman | 192/48.2 X |
| 4,162,051 | 7/1979 | Dolby | 242/75.5 |
| 4,223,855 | 9/1980 | Briedis | 242/75.5 |
| 4,363,455 | 12/1982 | Bianco | 242/75.5 |
| 4,564,092 | 1/1986 | Pierce | 192/48.2 |
| 4,570,768 | 2/1986 | Nishimura et al. | 192/48.2 |
| 4,733,577 | 3/1988 | Griesser et al. | 192/48.2 |

*Primary Examiner*—James T. McCall
*Attorney, Agent, or Firm*—Handal & Morofsky

[57] ABSTRACT

Clutch arrangement provided with an automatic, double-sided asynchronous switchgear (20) wherein a central disc (21) is connected with a first connection point and each side of the switchgear (20) is connected, through free-wheels (30, 40), with another connection point, the locking directions of the free-wheels (30, 40) being counter to each other.

When using the arrangement in a magnetic tape recorder and/or playback unit, the first connection point is connectible to one of the spindles (3), the second connection point to the frame (2) and the third connection point to the driving motor.

16 Claims, 2 Drawing Sheets

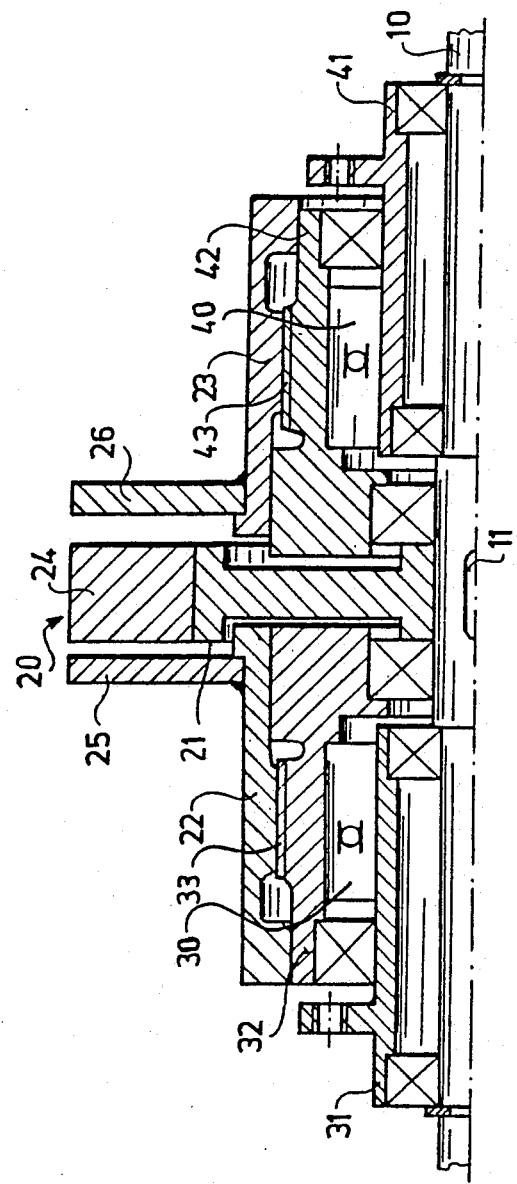
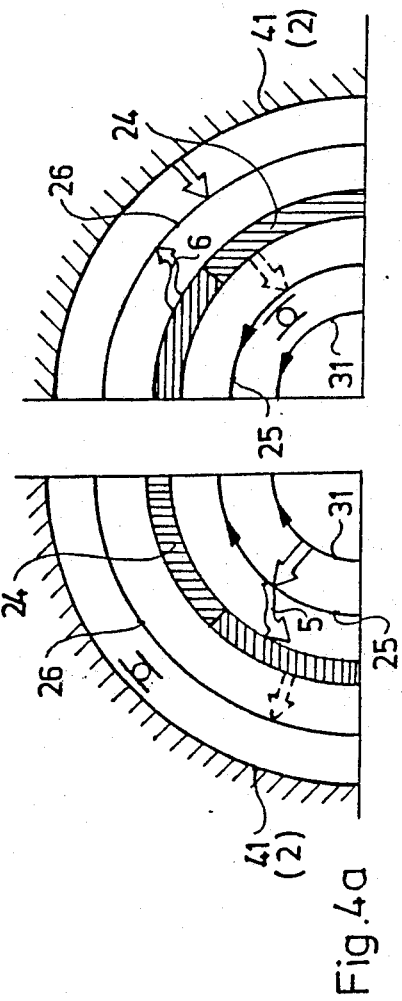

CLUTCH ARRANGEMENT, MAINLY FOR DRIVING THE TAPE-SPINDLE OF MAGNETIC TAPE RECORDER AND/OR PLAY-BACK UNIT

FIELD AND BACKGROUND OF THE INVENTION

The invention relates to a clutch arrangement, mainly for driving the tape-spindle of magnetic tape recorder and/or play-back unit, provided with three connection points and comprising an asynchronous switch-gear engaged with one of the connection points. Several clutch arrangements are already known in the field of mechanical engineering, particularly in the precision mechanics, and their variety is increasing with the emergence of new technical problems to be solved.

The book of Dr. Z. Terplan, titled "Special Clutches" (Múszaki Könyvkiadó, Budapest, 1971) can be regarded as a good example for this purpose.

In the field of precision mechanics, driving the tape-spindles of tape recorders represents one of the problems requiring the use of clutch. It is commonly known, that separate driving shafts directly in contact with the tape are necessary for regulating the play-back and recording speed of the tapes. However, the normal operation the unwinding spindle has to produce braking torque, whereas the winding spindle produces tape-tensioning torque, this tightening the tape in front of and behind the driving shaft. The problem is complicated in that appropriate stretching torques, both braking and take-up, are required for quick winding even at much higher tape speeds.

In the case of recorders used for professional purposes, mainly in multi-channel data recorders or loggers, two-way actuation of the tape is necessary, consequently the same spindle performs winding and unwinding alternately. Units with three motors have come to general use in the practice, where besides the driving motor, a separately controlled motor was connected with each shaft of both spindles, and control of the motors is necessary to provide the proper operating conditions.

The use of three motors and the associated control functions increase the space requirement and the costs, therefore it is understandable that providing a single motor construction that is comparable to the three motor solution is desirable. In the sets suitable for one-way play-back, such solution have been known where the winding torque was realized with magnetic switchgear by using direct connection with the driving motor. The magnetic switchgear is suitable for transmitting appropriate torque even when significant difference exists between the speeds of the two sides connected, see Dr. Ing. Christian Scholz: "Handbuch der Magnetbandspeichertechnik" (VEB Verlag Technik, Berlin 1978, pp. 287-289).

DISCLOSURE OF THE INVENTION

The invention is aimed at the realization of a clutch arrangement provided with three connection points, in which the arrangement is capable of transmitting, automatically according to the direction of rotation, a specific torque to the shaft connected with one of the connection points through engagement to one or the other positive drives (including the null speed drive) connected with the other two connection points.

The invention was based on the recognition that it is expedient to use a double-sided asynchronous switch-gear instead of the customary asynchronous switch-gears, the central part of which would form the main connection point, wherein each side of the switchgear can be connected through free-wheels towards the other two connection points, the locking direction of which is counter to each other. By making use of such a double-sided switchgear an inventive clutch arrangement was produced, which contains a free-wheel connected with the switchgear and with another connection point, a double-sided asynchronous switchgear, the central disk of which is interconnected with the first connection point, wherein one side of the switchgear is connected with the aforementioned free-wheel and the other side is connected, through another free-wheel, with the third connection point, and the locking direction of the second free-wheel is counter to that of the first free-wheel.

With respect to construction, the coaxial arrangement is favorable. The central disk of the switch-gear is connected with the shaft in the arrangement, without angular displacement, and both free-wheels are arranged in bearings around the shaft.

Producing constant torque in the case of different relative speeds may be a highly important requirement. The switchgear of an embodiment suitable for this purpose is formed by a magnetic switchgear, the central disk of which is fitted with a pole-ring built up with permanent magnets, opposite to which a magnetizable disk is arranged on each side, spaced apart through air gaps, fitted with bearings in relation to the shaft, and wherein the disks are engaged with the free-wheels.

Connection with the spindle of the magnetic tape recorder and/or play-back unit can be suitably achieved by connecting: (1) the central disk of the switchgear with the driven or braked tape-spindle; (2) the connection point, preferably its shaft stub, of the first free-wheel with the frame of the set; and (3) the connection point of the second free-wheel, preferably its shaft stub, with the motor.

BRIEF DESCRIPTION OF THE DRAWING

Further details and advantages of the clutch arrangement according to the invention will become clear on the basis of examples described with reference to the attached drawing, in which:

FIG. 2 shows a semi-sectional view of an embodiment, FIGS. 4a and 4b are kinetic diagrams illustrating the operation.

DETAILED DESCRIPTION OF PREFERRED EMBODIMENTS

Figure 1:
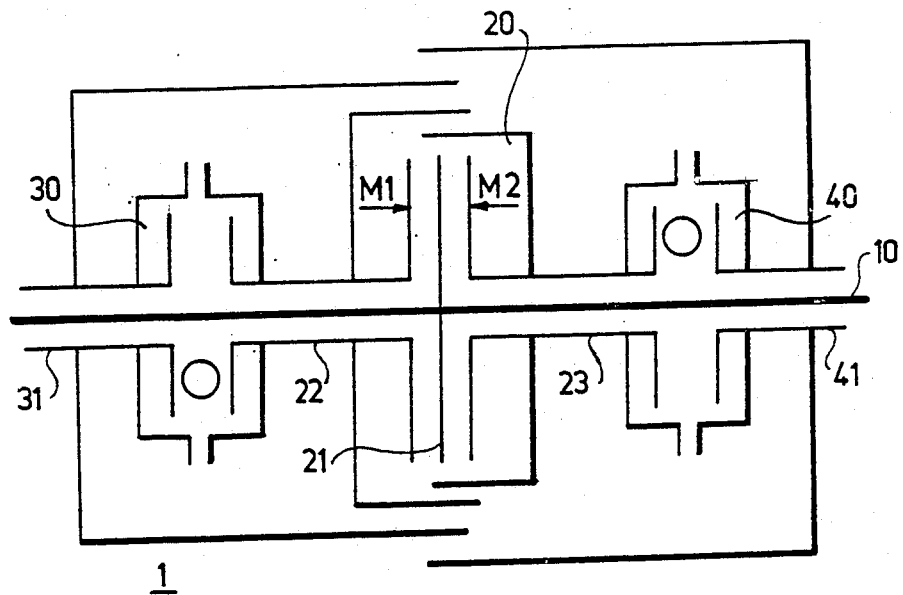
FIG. 1 shows the general structural outline of the clutch arrangement according to the invention.

The outline of a double-sided clutch arrangement 1 according to the invention is presented in FIG. 1. The marks were used according to the specifications of standard MSZ KGST (COMECON) 2519. A shaft 10 is situated in the centerline of the arrangement, one end of which forms one of the connection points of the arrangement. Power locking double-sided switchgear 20 is arranged around the shaft, the central disk 21 of which is connected with shaft 10, this connection (generally wedging or tight fit) preventing the angular displacement of disk 21 and shaft 10. Both sides of the switchgear 20 are connected with the central disk 21, between which the transmission of torque M1 and M2 of given magnitude is possible. The output shaft of the left switchgear is formed by bushing 22 fitted with bearings around and freely turning in relation to the shaft 10. The shaft of the right switchgear is formed by bushing 23 similar to bushing 22.

The first free-wheel 30 is connected with bushing 22 arranged in a bearing around the shaft 10, and its shaft stub 31, opposite to bushing 22 forms the second connection point of the arrangement. On the other side of the switchgear 20 a second free-wheel 40 is connected with bushing 23 and its shaft stub 41, opposite to bushing 23, forms the third connection point of the arrangement. The construction of free-wheels 30 and 40 is suitably identical, but their locking directions are counter to each other.

A semi-sectional view of an actual embodiment of the arrangement is shown in FIG. 2. The form-fitting connection between disk 21 of switchgear 20 and shaft 10 is provided by a wedge placed into keyslot 11. The external part of disk 21 is formed by polering 24 consisting of several permanent magnets, for example the pole-ring in a particular embodiment has eight magnetic poles. The magnetizing direction of these uniform, sector-shaped magnets is parallel with the shaft 10 and alternately are of opposite sense. Two magnetizable disks 25 and 26 are situated opposite to the pole-ring 24, and the magnetic lines of force of the magnets forming the pole-ring 24 bridge the intermediate air gap and become closed through disks 25 and 26.

Disc 25 forms part of the left switchgear and it is fixed to the right end of the internally threaded bushing 22. The construction of disk 26 is similar and fixed to the left end of the internally threaded bushing 23.

The internal bushing of the left free-wheel 30, to which shaft stub 31 belongs, is situated by bearings on shaft 10, and its external part 32 is provided with thread engaged with the internal thread of bushing 22. The inner end of the external part 32 is supported through bearing by shaft 10. Construction of the right free-wheel 40 is similar, and its external part 42 guides the bushing 23. The magnitude of the transmissible torque can be adjusted by the threaded engagement 33 and 43 which adjusts the width of the air gap between discs 25 and 26 and the pole-ring 24.

Figure 3:
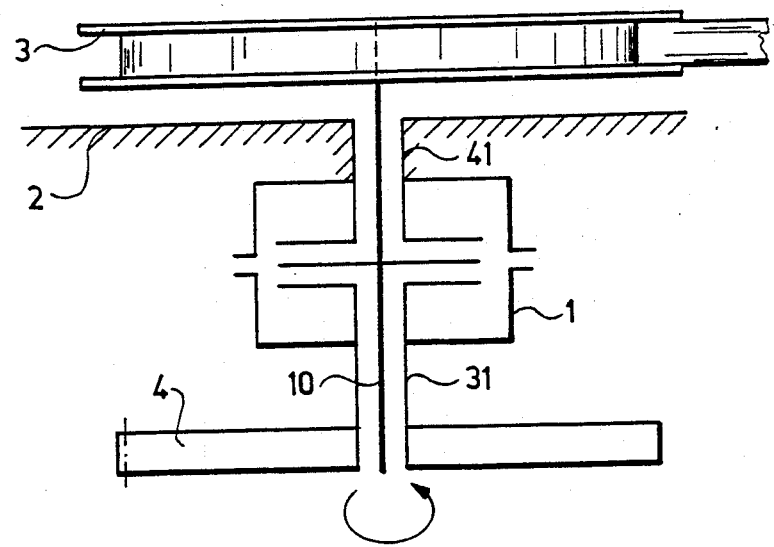
FIG. 3 shows the application outline showing a favourable utilization of the clutch arrangement.

A favorable utilization facility of the double-sided clutch arrangement 1 according to the invention is represented by the drive of the tape-spindles of the forward and backward playing single motor magnetic recorder. An example for such utilization is shown in the simplified outline of FIG. 3. One of the tape-spindles 3 is shown on the outside of frame 2 of the message recorder. On the other side of the frame 2 the double-sided clutch arrangement 1 according to the invention is fixed so that the shaft stub 41 of a free-wheel, corresponding free-wheel 40 of FIG. 2, is fastened to the frame 2, and shaft 10 forms the shaft of the tape-spindle 3 at the same time. Gear 4 is attached to the shaft stub 31 of a free-wheel, corresponding to free-wheel 30 of FIG. 2, gear 4 is connected with the message recorder's motor and it turns in one or the other direction when the motor is running. Its speed and direction of rotation are strictly determined by the motor. Operation of the clutch arrangement 1 according to the invention is described in connection with FIGS. 4a and 4b based on the example given in FIG. 3. Depending on the tape-actuating direction of the message recorder, the spindle 3 may be the winding or unwinding spindle of the set. The speed of the tape is not dependent on the torque produced by the tape-spindle, however, when winding up, the spindle 3 must produce a winding torque in the same direction corresponding to the specific constant speed of the tape, whereas during unwinding tightness of the tape moving in opposite direction has to be ensured by producing braking torque of a specific magnitude.

As shown in FIGS. 4a and 4b, the inventive clutch arrangement 1 automatically satisfies the described conditions, and switchover between the two operating modes is brought about by changing the direction of rotation of gear 4. The main structural elements of clutch 1 are marked with radially displaced circular arcs along a quarter circle as shown in FIG. 4a. The innermost circular arc corresponds to shaft stub 31, which is turned through gear 4 by the motor at a constant speed in the direction of arrow marked on the circular arc. In this direction the free-wheel 30 locks, and the bushing 22, together with disk 25, turns at the same angular velocity. The rigid coupling is illustrated by the radial arrow drawn with a double line in FIG. 4a. Rotation of the magnetizable disc 25 produces driving torque Mh to the opposite disk 21, more correctly to its pole-ring 24. The poles magnetized in different directions are marked with vertical and horizontal lines in FIGS. 4a and 4b. However, disk 21 is not capable of turning at the angular velocity of disk 25, because the tape speed is constant and it is lower than the peripheral speed at the fixed speed, which would occur for instance upon breakage of the tape. The tape-spindle 3 in rigid coupling through the shaft with the pole-ring 24 turns at a lower angular velocity than the disk 25 and the arising driving torque Mh represents the winding torque of the tape. The driving coupling given at the speed difference is marked by arrow 5 in FIG. 4a.

Rotation of the pole-ring 24 takes along rotation of the other opposite disc 26 as well. This rotation is not associated with torque, because the free-wheel 40 is not locked in this direction and releases the disc 26 in relation to the shaft stub 41 fixed to the frame 2. The torque-free co-rotation is shown by arrow marked with dashed line in FIG. 4a, whereas the free turn is illustrated by ball-like mark.

When rotation of the tape is reversed, the spindle 3 functions as unwinding spindle and it turns the pole-ring 24 in the opposite direction at an angular velocity corresponding to the speed of the tape. In this case the drive is produced by the tape. The conditions are shown in FIG. 4b. Compared with the case shown in FIG. 4a, the shaft stub 31 is turned by the motor in opposite direction at a speed higher than the perpheral speed of the pole-ring 24, which is marked with two arrows along the arc pertaining to shaft stub 31. At this point, the free-wheel 30 is driven in the opposite direction, but this is the direction of free turn for free-wheel 30; therefore, the rotation of the shaft stub 31 does not produce torque to the disk 25. The ball mark illustrates the free turn. The arrow marked with dashed line indicates that the disk 25 rotates without torque together with the pole-ring 24.

However, the free-wheel 40 locks in that direction, thus because of the stationary shaft stub 41, the bushing 23 and the attached disk 26 are also at a standstill. Braking torque Mf is brought about between the rotating pole-ring 24 and the stationary disk 26 marked by arrow 6. As a result of braking the tape becomes tight, and upon unwinding this tightness is maintained by the unwinding spindle.

Thus the clutch arrangement 1 according to the invention is capable of providing the necessary torque condition for the spindle 3 in both directions of the tape movement, moreover these conditions invariably exist not only at play-back speed, but upon quick forward and backward winding as well. The induction of the magnets used in the pole-ring 24 and the correct selection of the distance of air gaps allow the setting of the required torque. The axially ajdustable threaded engagement between external parts 32, 42 and bushings 22, 23 holding disks 25, 26 serves for the proper adjustability of the winding and braking torques. Since the operation requires changing the direction of rotation of the gear 4, i.e. changing the direction of progress of the tape, the clutch arrangement 1 according to the invention enables the realization of carriages driven by a single motor and suitable for two-way movement of the tape.

For the operation outlined in the foregoing, use of the megnetic connection in the switchgear 20 was preferable, however it is easily conceivable that the operation is not influenced if in the switchgear has an other than magnetic connections for example frictional (spring loaded) hydraulic, or any other interconnection producing torque transmission at different speeds between the connected parts.

Although the advantages were presented for use in message tape recorder, it will be evident for the specialist, that the clutch arrangement 1 provided with three connection points is favourably applicable in several other fields as well.

We claim:

1. A clutch arrangement having three connection points capable of imparting a specific torque to a shaft, said shaft connected to one of said three connection points, through engagement to one or the other of two positive drives connected with one or the other of the remaining two connections, respectively.

2. A clutch arrangement as claimed in claim 1 comprising:
    (a) a double-sided asynchronous switchgear having a central disk connected to said shaft at the first of said three connection points;
    (b) a first free-wheel having a locking direction, connecting one side of said double-sided asynchronous switchgear to the first of said two positive drives, thus forming the second of said three connection points; and
    (c) a second free-wheel connecting the second side of said double-sided asynchronous switchgear to the second of said two positive drives forming the third of said three connection points, wherein said second free-wheel has a locking direction opposite of said first free-wheel.

3. A clutch arrangement as claimed in claim 2, wherein both of said free-wheels are arranged in bearings allowing free rotation around said shaft.

4. A clutch arrangement as claimed in claim 3, wherein said switchgear is a magnetic switchgear wherein said central disk comprises a pole-ring having a plurality of permanent magnets and two magnetizable disks are arranged one on either side of said pole-ring, with gaps between said disks and said pole-ring and wherein said disks are each mounted on a free-wheel and may turn in relation to said shaft.

5. A clutch arrangement as claimed in claim 4, wherein said gaps between said disks and said pole-ring are adjustable.

6. A clutch arrangement as claimed in claim 5, wherein each of said disks is fixed to a threaded external part of one of said free-wheels with a threaded bushing.

7. A clutch arrangement as claimed in claim 2 wherein said central disk of said switchgear is connected to a spindle, via said shaft, the first drive force that said first free-wheel is connected to is a stationary frame and said second drive force that said second free-wheel is connected to is a drive motor.

8. A clutch arrangement having three connection points for transmitting a first specific torque to a shaft from a first driving means and a second specific torque from a second driving means, including null speed drive, said clutch arrangement comprising:
    (a) a double-sided asynchronous switchgear having a central disk connected to said shaft at the first of said three connection points;
    (b) a first free-wheel, having a locking direction, connecting one side of said double-sided asynchronous switchgear to said first driving means, thus forming the second of said three connection points; and
    (c) a second free-wheel connecting the second side of said double-sided asynchronous switchgear to said second driving means forming the third of said three connection points, wherein said second free-wheel has a locking direction opposite of said first free-wheel.

9. A clutch arrangement as claimed in claim 8, wherein said central disk of said asynchronous switchgear is connected with said shaft coaxially and both of said free-wheels are arranged in bearings so as to be rotatable around said shaft.

10. A clutch arrangement as claimed in claim 9, wherein both of said free-wheels are arranged in bearings allowing free rotation around said shaft.

11. A clutch arrangement as claimed in claim 10, wherein said switchgear is a magnetic switchgear wherein said central disk comprises a pole-ring having a plurality of permanent magnets and two magnetizable disks are arranged one on either side of said pole-ring, with gaps between said disks and said pole-ring and wherein said disks are each mounted on a free-wheel and may turn in relation to said shaft.

12. A clutch arrangement as claimed in claim 11, wherein said gaps between said disks and said pole-ring are adjustable.

13. A clutch arrangement as claimed in claim 12, wherein each of said disks is fixed to a threaded external part of one of said free-wheels with a threaded bushing.

14. A clutch arrangement as claimed in claim 8, wherein said central disk of said switchgear is connected to a spindle, via said shaft, the first driving means that said first free-wheel is connected to is a stationary frame and said second driving means that said second free-wheel is connected to is a drive motor.

15. A clutch arrangement as claimed in claim 8, wherein said clutch arrangement is used for driving or braking a tape spindle of a tape recorder/player unit.

16. A clutch arrangement for driving or braking a tape spindle of a magnetic recording and/or playing unit, said playing unit comprising:
    (a) a driving means for driving said spindle;
    (b) a frame; and
    (c) said clutch arrangement comprising:

(i) a double-sided asynchronous switchgear having a central disk connected to said spindle;
(ii) a first free-wheel connecting one side of said switchgear to said frame to provide a braking torque for said spindle in one direction; and
(iii) a second free-wheel connecting the other side of said switchgear to said driving means to provide a driving torque for said spindle in the other direction.

* * * * *

UNITED STATES PATENT AND TRADEMARK OFFICE
CERTIFICATE OF CORRECTION

PATENT NO. : 4,889,216

DATED : Dec. 26, 1989

INVENTOR(S) : Gabor Nagy, Gyorgy Neumann, both of Budapest, Hungary

It is certified that error appears in the above-identified patent and that said Letters Patent is hereby corrected as shown below:

Title page, item [73] should read as follows:

Assignee: BRG Mechatronikai Vallalat, Hungary

Signed and Sealed this

Eighth Day of January, 1991

Attest:

HARRY F. MANBECK, JR.

Attesting Officer

Commissioner of Patents and Trademarks